United States Patent [19]

Renaud

[11] Patent Number: 4,519,488
[45] Date of Patent: May 28, 1985

[54] CLUTCH RELEASE BEARING

[75] Inventor: Pierre Renaud, Le Plessis-Trevise, France

[73] Assignee: Valeo, Paris, France

[21] Appl. No.: 469,706

[22] Filed: Feb. 25, 1983

[30] Foreign Application Priority Data

Mar. 23, 1982 [FR] France .................. 82 04883

[51] Int. Cl.³ ............................................ F16D 23/14
[52] U.S. Cl. .................................. 192/98; 192/110 B; 384/617
[58] Field of Search ............... 192/98, 110 B; 308/233

[56] References Cited

U.S. PATENT DOCUMENTS

| 4,117,916 | 10/1978 | Baker | 192/98 |
| 4,144,957 | 3/1979 | deGennes | 192/98 |
| 4,186,828 | 2/1980 | Renaud | 192/98 |
| 4,403,685 | 9/1983 | Beccaris | 192/110 B |

FOREIGN PATENT DOCUMENTS

| 2151146 | 4/1973 | France . | |
| 2414147 | 8/1979 | France . | |
| 2459906 | 10/1981 | France . | |
| 1382354 | 1/1975 | United Kingdom . | |
| 1441804 | 7/1976 | United Kingdom | 192/98 |
| 2073353 | 10/1981 | United Kingdom . | |

*Primary Examiner*—Allan D. Herrmann
*Attorney, Agent, or Firm*—Charles E. Brown; Charles A. Brown

[57] ABSTRACT

In a clutch release bearing, on the surface of a bearing flange (14) of an operating member (10) is a wear-resistant plate (30) linked axially to the bearing flange (14) by at least one snap-fastener lug (34). The length of the snap-fastener lug (34) is greater than the thickness of the wear-resistant plate (30). Associated with the latter are indexing means (42) which are separate from the snap-fastener lug (34) and which project axially from the same side as the latter. They extend axially beyond at least that part of the snap-fastener lug (34) on which the wear-resistant plate (30) first bears during its engagement with the latter.

18 Claims, 13 Drawing Figures

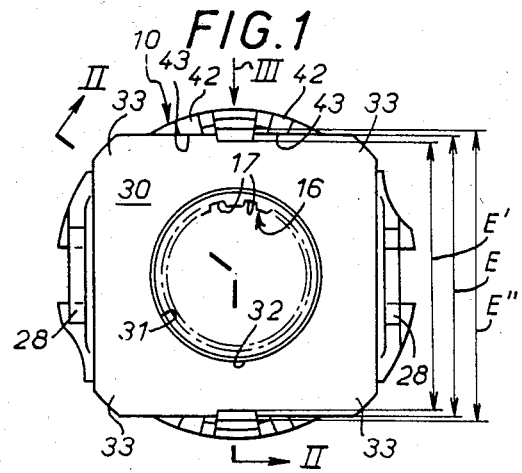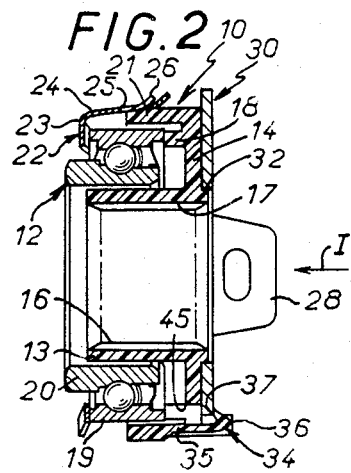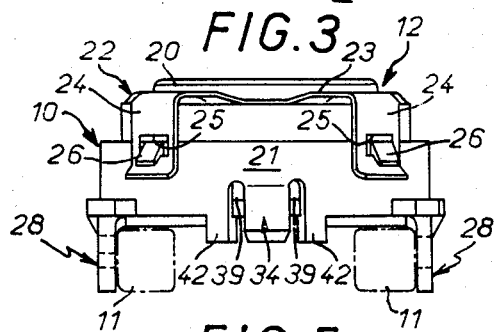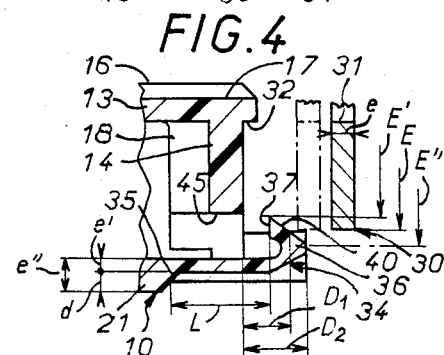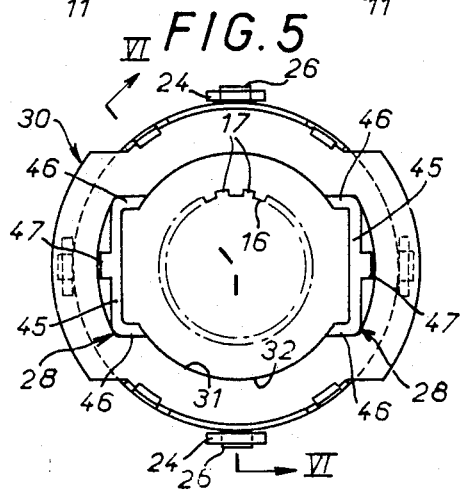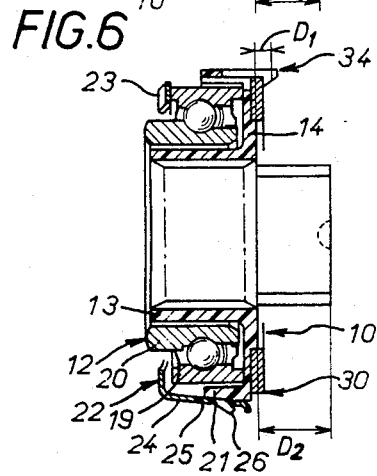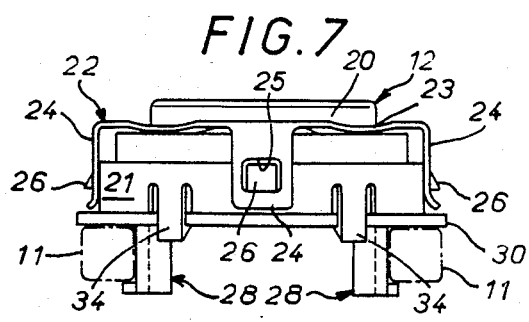

CLUTCH RELEASE BEARING

BACKGROUND OF THE INVENTION

1. Field of the Invention

The present invention is generally concerned with clutch release bearings intended primarily, but not exclusively, for controlling the clutch mechanism of an automotive vehicle.

2. Description of the Prior Art

As is known, a clutch release bearing generally comprises an operating member, adapted to be acted on by a control member, in practice a clutch release yoke, and a driving member linked axially to the operating member and adapted, when acted on by the latter, to operate the clutch release mechanism of the clutch.

The present invention is more particularly directed towards the case where the operating member comprises a transverse flange, hereinafter refered to for convenience as the bearing flange, on which the control member acts and on the surface of which is disposed a wear-resistant plate, appropriately fastened to it in the axial direction.

This is the case, in particular, when the operating member is made from a synthetic material, the wear-resistant plate then associated with its bearing flange being intended to prevent direct action of the control member on it, which could lead to rapid deterioration through wear, the plate being adapted to provide of itself sufficient resistance to wear with regard to such action.

A clutch release bearing in which the bearing flange of a synthetic material operating member is equipped in this way with a surface-mounted wear-resistant plate is described in French Patent of Addition No. 2 151 146 filed Aug. 20, 1971 under application No. 71 30367.

This French Patent of Addition proposes to provide the axial attachment of the wear-resistant plate to the operating member bearing flange by means of attachment lugs in the form of pegs or strips projecting from the bearing flange and having a root portion integral therewith, each peg or strip having a retaining shoulder facing the bearing flange for retaining the wear-resistant plate.

These attachment lugs offer the advantage of permitting the wear-resistant plate to be fitted to the operating member with a simple snap-fastener action, the wear-resistant plate causing temporary elastic deformation of the attachment lugs when axially engaged therewith, the attachement lugs subsequently returning to their initial configuration to provide an axial retention function by virtue of their retaining shoulder.

Although the practical embodiments of the attachment lugs proposed in the aforementioned French Patent of Addition constitute a satisfactory approach, they have the following disadvantages.

First of all, being in practice on the surface of the bearing flange from which they project, these attachment lugs necessarily have a length between their root portion and retaining shoulder which is too short for the necessary bending effect during snap-action engagement of the wear-resistant plate, as this length is strictly limited to the corresponding thickness of the wear-resistant plate.

Also, in the practical embodiments described in the aforementioned French Patent of Addition, there is no provision for indexing of the wear-resistant plate relative to the operating member during snap-action engagement of the wear-resistant plate on the bearing flange of the latter, the wear-resistant plate becoming engaged on an axial centering surface on the operating member only when such snap-action engagement is completed. Thus if the wear-resistant plate is not presented correctly relative to the corresponding snap-fastener attachment lugs during its axial engagement therewith, the wear-resistant plate can cause unwanted deformation of these attachment lugs, of a kind to compromise their proper working conditions and longevity. Nor is correct presentation of the wear-resistant plate relative to the centering surface on which it must be engaged necessarily obtained.

Finally, in these practical embodiments, these attachment lugs in fact have a two-fold function: on the one hand, as previously mentioned, they link the wear-resistant plate to the associated bearing flange in the axial direction and, on the other hand, they prevent the wear-resistant plate rotating relative to the bearing flange.

They may therefore be subjected to shear loads and, since they are designed to be capable of elastic deformation, do not necessarily have the appropriate characteristics to enable them to withstand such shear loads.

A general objective of the present invention is to provide an arrangement which overcomes these disadvantages.

SUMMARY OF THE INVENTION

The present invention consists in a clutch release bearing comprising a control member, an operating member, a transversely disposed flange on said operating member adapted to be acted on by said control member, a drive member linked axially to said operating member and adapted, when acted on by said operating member, to operate the release mechanism of a clutch, a wear-resistant plate disposed on the surface of said flange, at least one elastically deformable snap-fastener lug linking said wear-resistant plate axially to said flange, said lug having a root section which is integral with said operating member, a retaining shoulder facing towards said flange and adapted to retain said wear-resistant plate, and a length between said root portion and said shoulder which is greater than the corresponding thickness of said wear-resistant plate, and indexing means associated with said wear-resistant plate which are separate from said lug, project from the same side of said flange as said lug and extend axially beyond at least that portion of said lug on which said wear-resistant plate first bears during its engagement therewith.

In a specific embodiment of the invention, the indexing means thus associated in accordance with the invention with the wear-resistant plate comprise at least one special indexing tab, separate from the axial bosses in diametrically opposite relationship to one another which the operating member usually has, for the purpose of guiding and/or retaining the control member.

As an alternative, these indexing means may be formed by bosses.

Be this as it may, apart from the fact that, by virtue of a length exceeding the corresponding thickness of the wear-resistant plate the snap-fastener lug or lugs utilized offer all the elasticity necessary to their correct operation on axial engagement of the wear-resistant plate on the bearing flange of the operating member, the wear-resistant plate advantageously cooperates with the indexing means associated with it in accordance with the invention, during such engagement, before any contact with the snap-fastener lug or lugs. As a result, on the one hand, the wear-resistant plate is certain to interact appropriately with the snap-fastener lug or lugs and, on the other hand, its presentation relative to the centering surface on which it must be engaged is also certain to be appropriate.

Also, the indexing means associated in accordance with the invention with the wear-resistant plate offer the advantage of themselves constituting means for preventing rotation of the latter, so that the axial linking of the wear-resistant plate to the bearing flange of the operating member is dissociated from the prevention of rotation of the wear-resistant plate on the bearing flange, the snap-fastener lug or lugs providing such axial linking being exempt from any shear loads.

This has the advantage of promoting their longevity.

Other objects and advantages will appear from the following description of examples of the invention, when considered in connection with the accompanying drawings, and the novel features will be particularly pointed out in the appended claims.

IN THE DRAWINGS

FIG. 1 is a view in elevation, in the direction of arrow I in FIG. 2, of a clutch bearing in accordance with the invention.

FIG. 2 is an axial cross-section of the clutch release bearing on the line II—II in FIG. 1.

FIG. 3 is a plan view of the clutch release bearing, in the direction of arrow III in FIG. 1.

FIG. 4 shows to a larger scale part of FIG. 2 relating to the operating member of the clutch release bearing and a wear-resistant plate associated with a flange thereof.

FIGS. 5 to 7 are views analogous to those of FIGS. 1 to 3, respectively, relating to a first alternative embodiment.

Figure 8:
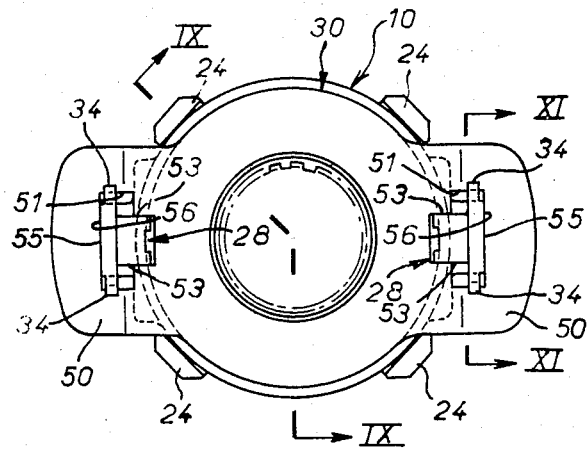
FIGS. 8 to 10 are also views analogous to those of FIGS. 1 to 3, respectively, relating to a second alternative embodiment.
Figure 9:
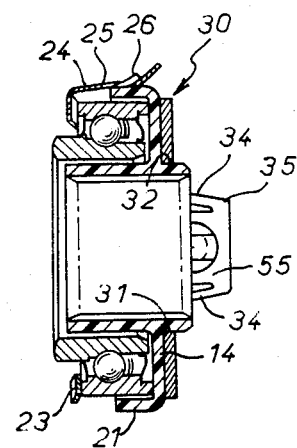
Figure 12:
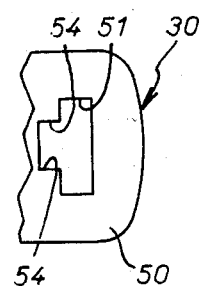
Figure 13:
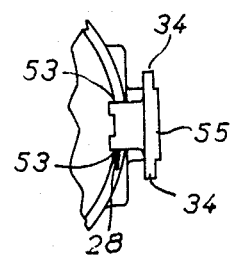

FIGS. 12 and 13 relate to parts of FIG. 8 and respectively show a wear-resistant plate associated with the bearing flange of the operating member of the clutch release bearing and the corresponding part of the operating member.

DESCRIPTION OF PREFERRED EMBODIMENTS

Figure 10:
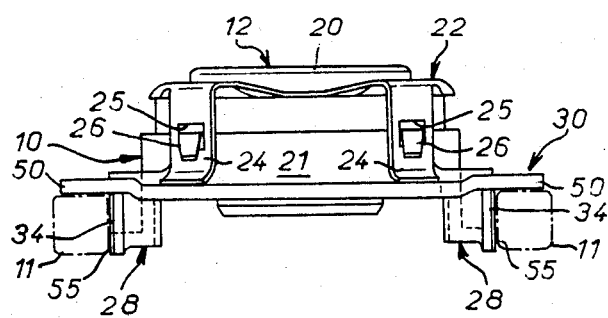

As shown in the figures, the clutch release bearing in accordance with the invention generally comprises, in a manner known per se, an operating member 10 which is adapted to be acted on by a control member, in practice a clutch release yoke having fingers 11 shown schematically in dashed outline in FIGS. 3, 7 and 10, and a driving member 12 which is linked axially to operating member 10 and is adpated, when acted on by the latter, to operate the release mechanism of a clutch. For example, in the case of a diaphragm spring clutch, it is adapted to act on the ends of the radial fingers (not shown) of the clutch.

In the embodiments shown, operating member 10, which is in practice made from a synthetic material, possibly reinforced with glass fibers, comprises a sleeve 13 whereby it is engaged and slides on a support and retaining member (not shown) and, integral therewith, a transverse flange 14, hereinafter referred to for convenience as the bearing flange, on one side of which driving member 12 bears and on the opposite side of which the associated control member acts.

In practice, in the embodiment shown and according to arrangements known per se, the internal bearing surface 16 of axial sleeve 13 is subdivided by grooves 17 adapted to gather up any material fouling the corresponding support and retaining member.

In practice, in the embodiment shown in FIGS. 1 to 4, bearing flange 14 carries an axially projecting annular boss 18 disposed around and spaced from axial sleeve 13. Because of specific application requirements, and by virtue of the component parts utilized, this maintains a defined distance between the control member and the release mechanism of the clutch.

In a manner known per se, in the embodiments shown, driving member 12 consists of a ball bearing, the outer ring 19 only of which bears on bearing flange 14, more specifically on annular boss 18 thereof. Its inner ring 20, extended for this purpose, is adapted to act on the release mechanism of the clutch.

Since the clutch release bearing is in practice of the self-centering type, driving member 12 is free to move transversely in all directions in contact with annular boss 18 of bearing flange 14, within limits of annular clearance defined by an axial rim 21 projecting for this purpose from the edge of bearing flange 14.

In a manner also known per se, in the embodiments shown, driving member 12 is axially linked to operating member 10 by a cap 22 comprising a transverse front wall 23, through which it bears on driving member 12, more specifically on outer ring 19 of the ball bearing constituting same, and a plurality of axial lugs 24 distributed circumferentially and four in number in the embodiments shown. By means of openings 25 it is engaged on hooks 26 which project radially outwards for this purpose, spaced around axial rim 21 of operating member 10.

Being a self-centering clutch release bearing in which the self-centering action is maintained, front wall 23 of cap 22 constitutes an axially acting elastic ring, having for this purpose, for example and as shown, undulations of the same kind as those of elastic rings commercially available under the trade name "ONDUFLEX".

On the side of bearing flange 14 opposite driving member 12, operating member 10 comprises two axially projecting bosses 28 in diametrically opposite relationship to one another, adapted to guide and/or retain the control member.

In the embodiment shown in FIGS. 1 to 4, bosses 28 constitute lugs, generally parallel to one another, and the guiding and retaining of the clutch release bearing are implemented through fingers 11 of the control member being adapted to cooperate transversely with those surfaces of these bosses which face one another, within the volume delimited by the bosses.

In a manner known per se, on bearing flange 14, and more specifically on that surface of bearing flange 14 which is opposite driving member 12 and on which the associated control member acts, is a wear-resistant plate 30, in practice of metal, adapted to protect bearing flange 14 from the action of the control member.

By means of a central opening 31, wear-resistant plate 30 is engaged on an axial bearing surface 32 which projects circumferentially for this purpose from bearing flange 14, to center it.

In the embodiment shown in FIGS. 1 to 4, wear-resistant plate 30 has a rectangular peripheral contour with chamfered corners 33 which locally extend beyond the contour of operating member 10, more specifically beyond the contour of axial rim 21 thereof, which is circular.

For preference, and as shown, the chamfered corners 33 by virtue of which wear-resistant plate 30 projects radially beyond the contour of operating member 10 are aligned with hooks 26 also projecting from axial rim 21 of operating member 10 for coupling cap 22, to protect these hooks and to render this coupling more secure.

In practice, and as will be noticed, chamfered corners 33 of wear-resistant plate 30 are disposed overall on a circumference which corresponds to the greatest radius of operating member 10.

As a result, wear-resistant plate 30 does not extend beyond the overall contour of the clutch release bearing when disposed in a container, for example, constituting packaging for it, for example.

Be this as it may, wear-resistant plate 30 is, in a manner known per se, linked axially to bearing flange 14 of operating member 10 by at least one elastically deformable snap-fastener lug 34 having a root portion 35 integral with operating member 10 and a head 36 with a retaining shoulder 37 directed towards bearing flange 14 in order to retain wear-resistant plate 30.

In practice, at least two snap-fastener lugs 34 are provided.

In accordance with the invention, and in combination, the length L of a snap-fastener lug 34 between its root portion 35 and its retaining shoulder 37 is greater than the corresponding thickness e of wear-resistant plate 30 and, as will be described in more detail hereinafter, there are associated with wear-resistant plate 30 indexing means separate from snap-fastener lugs 34 and projecting axially from bearing flange 14 of operating member 10, on the same side of the latter, which, relative to bearing flange 14, extend axially beyond at least that part of snap-fastener lugs 34 on which wear-resistant plate 30 first bears during its engagement therewith.

In the embodiment shown in FIGS. 1 to 4, only two snap-fastener lugs 34 are provided, in diametrically opposite positions relative to one another, alternating with bosses 28 and spaced by substantially 90° from the latter.

In practice, snap-fastener lugs 34 are disposed at the edge of bearing flange 14 of operating member 10, to cooperate with the edge of the corresponding sides of wear-resistant plate 30, between the latter's chamfered corners.

Their retaining shoulder 37 extends radially inwards, towards the axis of the assembly, and they are themselves elastically deformable as a whole in the radially outwards direction, away from this axis.

In practice, in this embodiment, snap-fastener lugs 34 are axially aligned with and extend in the opposite direction to axial rim 21 of operating member 10.

In practice, in this embodiment, each snap-fastener lug 34 is at least partially formed from axial rim 21 of operating member 10, its root portion 35 being on the opposite side of bearing flange 14 (in the axial direction) to its retaining shoulders 37, slots 39 separating it laterally from the main part of axial rim 21.

Thus the length of each snap-fastener lug 34 as defined hereinabove is greater than the combined thickness of bearing flange 14 of operating member 10 and wear-resistant plate 30 associated therewith.

Finally, head 36 of each snap-fastener lug 34 in practice features an oblique engagement surface 40 for wear-resistant plate 30 and which moves towards the axis of the assembly at the same time as the associated retaining shoulder 37.

The separation E in the radial direction between the edges of wear-resistant plate 30 with which snap-fastener lugs 34 interact is between the radial distances E' and E'' between the corresponding ends of oblique engagement surfaces 40 of snap-fastener lugs 34, as shown in FIGS. 1 and 4.

As a result, when it is engaged on snap-fastener lugs 34, wear-resistant plate 30 bears on the central area of oblique engagement surface 40 of snap-fastener lugs 34.

Referring to FIG. 4, D1 is the distance from bearing flange 14 of operating member 10 to the central area of oblique engagement surfaces 40 of snap-fastener lugs 34 on which wear-resistant plate 30 first bears when it is engaged with the latter.

Thus as will be seen, especially from FIG. 4, the thickness e' of each snap-fastener lugs 34 is reduced as compared with the thickness e'' of the material of that part of operating member 10 to which is attached root portion 35 of snap-fastener lugs 34.

Thus, in the embodiment shown in FIGS. 1 to 4, the inside surface of a snap-fastener lug 34 is aligned with that of axial rim 21 of operating member 10, whereas its outside surface is radially set back from axial rim 21 by a distance d which is equal to the difference between the corresponding thickness e'' and e'.

Finally, in the embodiment shown in FIGS. 1 to 4, the indexing means associated with wear-resistant plate 30 comprise at least one indexing tab 42 separate from bosses 28 but, like these, integral with bearing flange 14 of operating member 10. In practice, in this embodiment there are two indexing tabs 42 for each snap-fastener lug 34, one on each side thereof and each beyond the corresponding slot 39, each indexing tab having a thickness greater than that of the main part of snap-fastener lug 34.

In relation to bearing flange 14 of operating member 10, indexing tabs 42 extend axially over a distance D2 which is greater than the previously mentioned distance D1. Thus they extend axially beyond that part of snap-fastener lugs 34 on which wear-resistant plate 30 first bears when it is engaged with snap-fastener lugs 34.

For the purposes of cooperation with wear-resistant plate 30, each indexing tab 42 has a plane facet 43 facing towards the axis of the assembly, plate facets 43 of two indexing tabs 42 bracketing a given snap-fastener lug 34 being coplanar.

Finally, in the embodiment shown in FIGS. 1 to 4, operating member 10 is in practice made as a single molding with integral snap-fastener lugs 34 and indexing tabs 42. Bearing flange 14 of operating member 10 and annular boss 18 thereon are conjointly formed, in line with each snap-fastener lug 34, with an aperture 45 which corresponds to the position of the molding die utilized to form head 36 of snap-fastener lug 34.

When it is fitted, as shown schematically in dashed line in FIG. 4, wear-resistant plate 30 first comes into engagement with indexing tabs 42, before coming into contact with oblique engagement surface 40 of snap-fastener lugs 34.

It is thus correctly positioned relative to snap-fastener lugs 34 and relative to centering surface 32 on which it must be engaged on completion of its fitting.

Correctly guided in this way parallel to the axis of the assembly by indexing tabs 42, wear-resistant plate 30, when it comes into contact with oblique engagement surface 40 of snap-fastener lugs 34, causes the latter to temporarily deform elastically in the radially outward direction, this being facilitated by the relatively great length L of snap-fastener lugs 34.

Finally, when wear-resistant plate comes into contact with bearing flange 14 of operating member 10 on completion of its fitting, snap-fastener lugs 34 return elastically to their initial configuration and engage wear-resistant plate 30 with their retaining shoulder 37 so as to retain the latter in the axial direction.

As will be noted, the snap-fitting of wear-resistant plate 30 onto operating member 10 occurs in one axial direction, as described hereinabove, whereas that of cap 22 for retaining driving member 12 is effected in the opposite axial direction.

Thus, if required, wear-resistant plate 30 and cap 22 and drive member 12 may be fitted simultaneously, in a single and unique assembly operation.

As will be noted, plate facets 43 of indexing tabs 42 constitute means for preventing rotation of wear-resistant plate 30, favoring a reduction in the thickness of the main part of snap-fastener lugs 34, which are thereby exempt from any shear loads in operation.

FIGS. 5 to 7 show the application of the invention to the situation in which fingers 11 of the control member must cooperate with bosses 28 on the opposite sides thereof, outside the volume delimited by bosses 28.

In practice, in the embodiment shown, bosses 28 are each formed by a flange 45 with perpendicular terminations 46 facing the opposite boss 28.

In the central region of its free edge, flange 45 of boss 28 has a tab 47 adapted to retain the control member in the axial direction, extending in the direction opposite to terminations 46.

In accordance with the invention, the indexing means associated with wear-resistant plate 30 are formed in this case by bosses 28, more specifically by perpendicular terminations 46 thereof, which constitute means for preventing rotation of wear-resistant plate 30.

As will be noted, the indexing means which bosses 28 thus constitute extend in the axial direction beyond snap-fastener lugs 34 relative to bearing flange 14.

In practice, in the embodiment shown wear-resistant plate 30 has a circular peripheral contour between bosses 28, snap-fastener lugs 34 adapted to cooperate with its edge being four in number, and the outside surface of each snap-fastener lug 34 is aligned with that of axial rim 21 of operating member 10, its inside surface, on the other hand, being set back relative to that of the latter.

Finally, in the embodiment shown driving member 12 bears directly on bearing flange 14 of operating member 10, there being no annular projecting boss thereon.

Conjointly, snap-fastener lugs 34 are in all other respects of the same type as described previously.

In the embodiment shown in FIGS. 8 to 13, the indexing means associated with wear-resistant plate 30 are also formed by bosses 28 of operating member 10 provided to guide and/or retain the control member.

In practice, in the embodiment shown wear-resistant plate 30 has two lugs 50 in diametrically opposite relationship to one another, each formed with an aperture 51 to permit its axial engagement on corresponding boss 28.

The contour of aperture 51 is at least in part complementary to that of boss 28, whereby bosses 28 actually constitute the necessary indexing means.

For example, and as shown, each boss 28 may comprise, parallel to the radial plane of the assembly passing through the central area of lugs 50 of wear-resistant plate 30, facets 53 adapted to cooperate for indexing and rotation prevention purposes with complementary edges 54 of opening 51 of lug 50 (FIGS. 8, 12 and 13).

Further, in the embodiment shown snap-fastener lugs 34 utilized adjoin bosses 28.

In practice, in this embodiment there are two snap-fastener lugs 34 for each boss 28, disposed in back to back relationship with boss 28, more specifically in back to back relationship with a flange 55 integral with boss 28.

As previously, the thickness of each snap-fastener lug 34 is small in relation to that of the material of that part of operating member 10 with which its root portion is integral, in this instance associated flange 55, being radially set back relative to surface 56 of flange 55 which is outwardly directed.

Also as previously, the length of each snap-fastener lug 34 is greater than the combined thicknesses of bearing flange 14 of operating member 10 and wear-resistant plate 30 associated with the latter.

Figure 11:
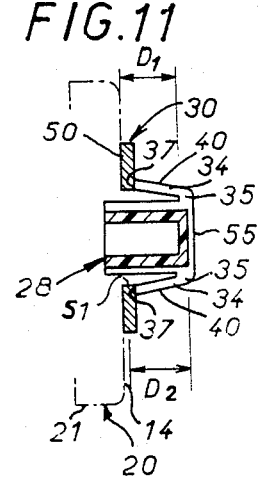
FIG. 11 is a partial transverse cross-section through this second alternative embodiment, on the line XI—XI in FIG. 8.

Also, root portion 35 of a snap-fastener lug 34 is disposed along the free edge of flange 55 with which it is associated, the snap-fastener lug extending obliquely towards bearing flange 14 from said free edge of flange 55 (FIG. 11).

In other words, in this embodiment the two snap-fastener lugs 34 extending from the edge of flange 55 are generally speaking in barb-like relationship to the edge of flange 55.

As previously, since they extend obliquely they have an external oblique engagement surface 40. The area of this on which wear-resistant plate 30 first bears during its engagement with the latter, through its corresponding aperture 51, is at a distance D1 from bearing flange 14 of operating member 10 which is less than the distance D2 from bearing flange 14 to the ends of corresponding bosses 28.

Thus, and as previously, when it is fitted wear-resistant plate 30 first comes into engagement with the indexing means constituted by bosses 28, before coming into contact with snap-fastener lugs 34.

Also as previously, during such fitting wear-resistant plate 30 causes temporary elastic deformation of snap-fastener lugs 34, before they engage with a snap action under retaining shoulders 37 thereof.

But, as will be noted, snap-fastener lugs 34 then deform elastically towards the axial plane of the assembly which intersects the central area of lugs 50 of wear-resistant plate 30, before returning to their initial configuration It will be understood that various changes in the details, materials and arrangements of parts which have been herein described and illustrated in order to explain the nature of the invention may be made by those skilled in the art within the principle and scope of the invention as expressed in the appended claims.

It is claimed:

1. A clutch release bearing comprising a control member, an operating member, a transversely disposed flange on said operating member adapted to be acted on by said control member, a drive member adapted to cooperate with a release mechanism of a clutch, means axially linking said drive member to said operating member, a wear-resistant plate disposed on a surface of said flange facing away from said drive member, at least one elastically deformable snap-fastener lug linking said wear-resistant plate axially to said flange, said lug having a root section in one piece with said operating member, a retaining shoulder facing towards said flange and adapted to retain said wear-resistant plate, and the distance between said root portion and said shoulder being greater than the corresponding thickness of said wear-resistant plate, and indexing means for locating said wear-resistant plate relative to said operating member, said indexing means being separate from said lug and projecting from the same side of said flange as said lug and extending axially beyond at least that portion of said lug which first bears against said wear-resistant plate during its engagement therewith.

2. A clutch release bearing according to claim 1, wherein said indexing means are in one piece with said operating member.

3. A clutch release bearing according to claim 1, wherein said lug extends from an outer peripheral edge of said flange.

4. A clutch release bearing according to claim 3, wherein said operating member has a rim extending axially from the edge of said flange, away from said wear-resistant plate and said lug being axially aligned with said rim.

5. A clutch release bearing according to claim 4, wherein said lug is at least partially formed by said rim, said root portion being on the opposite side of said flange to said shoulder, said rim having axial slots forming means for separating said lug laterally from the rest of said rim.

6. A clutch release bearing according to claim 1, wherein said operating member comprises two axially disposed bosses in diametrically opposite relationship to each other and forming means for guiding and/or retaining the control member, and wherein said indexing means comprise at least one indexing tab separate from said bosses.

7. A clutch release bearing according to claim 6, comprising a respective pair of indexing tabs disposed one on circumferentially opposite sides of said lug.

8. A clutch release bearing according to claim 7, wherein each of said indexing tabs has a plane facet cooperable with said wear-resistant plate.

9. A clutch release bearing according to claim 1, wherein said lug is elastically deformable in a radially outward direction, away from the axis of the bearing.

10. A clutch release bearing according to claim 1, wherein said lug extends, starting from said root portion, in the direction towards said flange and said root portion is disposed axially beyond said shoulder relative to said flange.

11. A clutch release bearing according to claim 10, wherein said operating member comprises two axially disposed bosses in diametrically opposite relationship to each other and adapted to guide and/or retain said control member and said lug adjoins one of said bosses.

12. A clutch release bearing according to claim 11, comprising a respective pair of lugs associated with each boss, disposed in back-to-back barb-like relationship to said boss.

13. A clutch release bearing according to claim 10, wherein said lug is inwardly deformable, towards an axial plane of the bearing.

14. A clutch release bearing according to claim 10, wherein said operating member comprises two axially disposed bosses in diametrically opposite relationship to each other, adapted to guide and/or retain said control member, and constituting said indexing means, said bosses being disposed radially inwardly of the periphery of said wear-resistant plate.

15. A clutch release bearing according to claim 1, wherein said indexing means constitute means for preventing rotation of said wear-resistant plate.

16. A clutch release bearing according to claim 1, wherein the thickness of said lug is small in relation to the thickness of the material of that part of said operating member to which its root portion is joined.

17. A clutch release bearing according to claim 1, wherein the length of said lug is greater than the combined thicknesses of said flange and said wear-resistant plate.

18. A clutch release bearing according to claim 1, said means axially linking said drive member to said operating member comprising a spring clip having tabs attached near a free end of said rim.

* * * * *